(12) United States Patent
Jung et al.

(10) Patent No.: US 8,878,486 B2
(45) Date of Patent: Nov. 4, 2014

(54) BATTERY PACK FOR CHARGING A MOBILE TERMINAL BY RECEIVING ELECTRIC POWER FROM AN EXTERNAL CHARGER, AND A MOBILE TERMINAL WITH THE SAME

(75) Inventors: Chun-Kil Jung, Seoul (KR); Yoon-Sang Kook, Gwacheon-si (KR)

(73) Assignee: Hanrim Postech Co., Ltd., Suwon-Si (KR)

( * ) Notice: Subject to any disclaimer, the term of this patent is extended or adjusted under 35 U.S.C. 154(b) by 423 days.

(21) Appl. No.: 12/786,153

(22) Filed: May 24, 2010

(65) Prior Publication Data

US 2010/0295505 A1 Nov. 25, 2010

(30) Foreign Application Priority Data

May 22, 2009 (KR) .................. 10-2009-0044847

(51) Int. Cl.
 *H02J 7/00* (2006.01)
 *H01M 10/48* (2006.01)
 *H01M 10/42* (2006.01)
 *H01M 2/20* (2006.01)
 *H01M 2/10* (2006.01)
 *H02J 7/02* (2006.01)
 *H02J 5/00* (2006.01)

(52) U.S. Cl.
 CPC .......... *H01M 2/1022* (2013.01); *H01M 10/486* (2013.01); *H01M 10/42* (2013.01); *H02J 5/005* (2013.01); *H01M 2220/30* (2013.01); *H02J 7/0045* (2013.01); *H01M 10/425* (2013.01); *H01M 2/204* (2013.01); *H02J 7/0042* (2013.01); *H02J 7/025* (2013.01)
 USPC ............................................. 320/108

(58) Field of Classification Search
 CPC ....... H02J 7/0042; H02J 7/0045; H02J 7/025; H02J 7/005; H01M 10/425
 USPC .......................................... 320/108, 112, 114
 See application file for complete search history.

(56) References Cited

U.S. PATENT DOCUMENTS

| | | | |
|---|---|---|---|
| 6,225,778 B1 * | 5/2001 | Hayama et al. ............... | 320/112 |
| 7,541,771 B1 * | 6/2009 | Leavitt et al. ................ | 320/112 |
| 7,605,564 B2 * | 10/2009 | Sukurai et al. ............... | 320/132 |
| 2006/0061326 A1 * | 3/2006 | Vine et al. .................... | 320/108 |
| 2006/0205381 A1 * | 9/2006 | Beart et al. .................. | 455/343.1 |
| 2008/0111518 A1 * | 5/2008 | Toya ............................. | 320/108 |
| 2009/0001931 A1 * | 1/2009 | Lin ............................... | 320/108 |
| 2010/0066305 A1 * | 3/2010 | Takahashi et al. ........... | 320/108 |
| 2010/0194336 A1 * | 8/2010 | Azancot et al. .............. | 320/108 |

FOREIGN PATENT DOCUMENTS

| | | |
|---|---|---|
| JP | 2003-125544 A | 4/2003 |
| KR | 10-2008-0053808 A | 6/2008 |
| KR | 10-0836634 | 6/2008 |
| WO | WO 2009011475 A1 * | 1/2009 |

\* cited by examiner

*Primary Examiner* — Yalkew Fantu
*Assistant Examiner* — Manuel Hernandez
(74) *Attorney, Agent, or Firm* — Stein IP, LLC

(57) ABSTRACT

Various embodiments of a battery pack, a mobile terminal having such a battery pack, and related methods are disclosed. In one exemplary embodiment, a battery pack for a mobile terminal may include a battery cell, a temperature sensor configured to measure a temperature of the battery cell, a charge detector configured to detect whether the battery cell is charged above a predetermined level, and a first connector terminal configured to electrically connect to the mobile terminal.

5 Claims, 11 Drawing Sheets

BATTERY PACK FOR CHARGING A MOBILE TERMINAL BY RECEIVING ELECTRIC POWER FROM AN EXTERNAL CHARGER, AND A MOBILE TERMINAL WITH THE SAME

This application claims the benefit of priority under 35 U.S.C. §119(a) to Korean Patent Application No. 10-2009-0044847, filed on May 22, 2009, the disclosure of which is incorporated by reference in its entirety as if fully set forth herein.

BACKGROUND

1. Technical Field

Various embodiments of the present disclosure generally relate to mobile terminals. In particular, certain embodiments relate to battery packs for mobile terminals and mobile terminals having battery packs.

2. Description of Related Art

A battery pack is a device for charging a mobile terminal by receiving electrical power (electrical energy) from an external charger. Examples of mobile terminals may include cellular phones, personal digital assistants (PDAs), portable media players, portable computers, and any other portable devices having chargeable batteries. A battery pack may include, for example, a battery cell for storing the electrical energy and a circuit for charging and discharging the battery cell.

One method for supplying electrical energy to a battery pack is to supply the electrical energy to the battery pack via a terminal of the battery pack. The terminal of the battery pack converts the received electrical power to an appropriate voltage or current that is suitable for charging the battery pack.

Recently, wirelessly supplying electrical energy to the battery pack has been proposed. This method uses the wireless power transmission/reception technology.

SUMMARY

Disclosed exemplary embodiments provide battery packs for mobile terminals, covers for mobile terminals, and mobile terminals having at least one of the aforementioned battery packs and covers.

To attain the advantages and in accordance with the purposes of the invention, as embodied and broadly described herein, one exemplary aspect of the present disclosure may provide a battery pack for a mobile terminal, comprising a battery cell, a temperature sensor configured to measure a temperature of the battery cell, a charge detector configured to detect whether the battery cell is charged above a predetermined level, and a first connector terminal configured to electrically connect to the mobile terminal. In some exemplary aspects, at least one of the temperature sensor, the charge detector, and the first connector terminal is disposed on a surface of the battery cell.

In another exemplary aspect, the battery pack may further comprise an electrical power coil configured to receive a wireless electrical power signal from an external device. The battery pack may also comprise a shielding plate for shielding a magnetic field from the electrical power coil. In some exemplary embodiments, the shielding plate may be installed between the battery cell and the electrical power coil.

According to still another exemplary aspect, the battery pack may further comprise a rectifier configured to rectify the wireless electrical power signal received from the electrical power coil, a power controller configured to control the rectified power signal from the rectifier, and a charge controller configured to control a charging of the battery cell by using the controlled rectified power signal from the power controller. In some exemplary embodiments, the first connector terminal may be attached to the charge detector.

According to various exemplary aspects, the first connector terminal may comprise a first terminal attached to a first surface of the battery cell, and a second terminal attached to a second surface of the battery cell, where the first surface and the second surface may be aligned perpendicularly to one another. In one exemplary embodiment, the first terminal and the second terminal may be integrally connected to one another in a shape of letter "L," for example.

In another exemplary aspect, the battery pack may further comprises a second connector terminal disposed inside the mobile terminal, and a third connector terminal disposed inside the mobile terminal, wherein the first terminal of the first connector terminal is electrically connected to the second connector terminal and the third connector terminal.

In still another exemplary aspect, the battery pack may also comprise a fourth connector terminal disposed on a cover of the mobile terminal, wherein the second terminal of the first connector terminal is electrically connected to the fourth connector terminal.

Some exemplary aspects of the present disclosure may also provide a cover of a mobile terminal comprising an electrical power coil configured to receive a wireless electrical power signal from an external device, and a connector terminal configured to transmit the wireless electrical power signal received from the electrical power coil to a battery pack of the mobile terminal. In one exemplary embodiment, the connector terminal may comprise a plate spring. Further, in another exemplary embodiment, the cover may comprise a shielding plate disposed between a battery cell and the electrical power coil for shielding a magnetic field generated from the electrical power coil.

In still another exemplary aspect, the connector terminal may be electrically connected to a connector terminal of the battery pack. According to another exemplary aspect, the cover may also comprise a cap having a penetrating hole for connecting the connector terminal of the cover to the connector terminal of the battery pack.

The cover, according to some exemplary aspects, may further comprise a rectifier configured to rectify the wireless electrical power signal received from the electrical power coil, a power controller configured to control the rectified power signal received from the rectifier, and a charge controller configured to control a charging of the battery cell by using the controlled rectified power signal from the power controller.

Another exemplary aspect of the present disclosure may provide a mobile terminal comprising a first connector terminal configured to receive a wireless electrical power signal, a rectifier configured to rectify the wireless electrical power signal received from the connector terminal, a power controller configured to control the rectified power signal received from the rectifier; and a charge controller configured to control a charging of a battery cell by using the controlled rectified power signal received from the power controller.

In some exemplary aspects, the mobile terminal may further comprise a cover substantially enclosing at least the battery cell, where the cover may comprise an electrical power coil configured to receive the wireless electrical power signal from an external device. The mobile terminal may also comprise a second connector terminal configured to transmit the wireless electrical power signal from the electrical power coil to the battery cell.

In another exemplary aspect, the second connector terminal may comprise a plate spring. According to still another exemplary aspect, the cover may further comprise a shielding plate disposed between the battery cell and the electrical power coil for shielding a magnetic field generated from the electrical power coil.

In one exemplary aspect, the second connector terminal may be electrically connected to a connector terminal of a battery pack. The cover may further comprise a cap with a penetrating hole for connecting the second connector terminal to the connector terminal of the battery pack.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the elements and combinations particularly pointed out in the written description and claims hereof as well as the appended drawings.

It is to be understood that both the foregoing general description and the following detailed description are exemplary and explanatory only and are not restrictive of embodiments thereof, as claimed.

BRIEF DESCRIPTION OF THE DRAWINGS

The accompanying drawings, which are incorporated in and constitute a part of this disclosure, illustrate various exemplary embodiments consistent with the present disclosure and, together with the description, serve to explain the principles of the disclosure.

DETAILED DESCRIPTION

Figure 1:
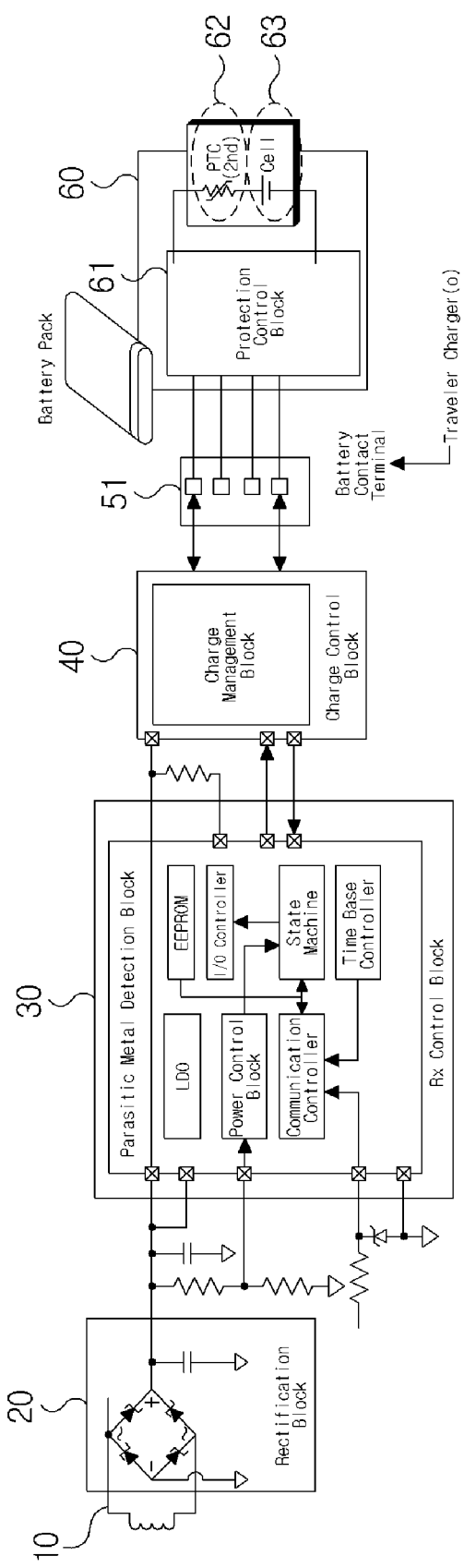
FIG. 1 is a block diagram illustrating an exemplary layout of a control module for wirelessly charging a battery, consistent with various exemplary aspects of the present disclosure.

Reference will now be made in detail to the exemplary embodiments consistent with the present disclosure, examples of which are illustrated in the accompanying drawings. Wherever possible, the same reference characters will be used throughout the drawings to refer to the same or like parts.

While only several exemplary embodiments and features of the invention are described herein, modifications, adaptations, and other implementations may be possible, without departing from the spirit and scope of the disclosed embodiments. Accordingly, the following detailed description does not limit the embodiments. Instead, the proper scope is defined by the appended claims.

The terms "module," "block," "unit," and "part" are used to facilitate explaining various exemplary embodiments of the present disclosure and are not necessarily intended to impart any special meaning thereto. In some instances, the terms may refer to the same element and are used interchangeably. For example, the term "rectifier module," "rectifier block," and "rectifier," as used in certain exemplary embodiments, may refer to the same element or elements. Alternatively, the terms may refer to different element or elements. Further, the terms may be used to refer to one or more elements or different combinations of various elements.

Embodiments of the present disclosure may apply to various types of mobile terminals. Examples of mobile terminals may include cellular phones, smart phones, personal digital assistants (PDAs), portable multimedia players (PMPs), portable computers, global positioning systems (GPSs), etc.

FIG. 1 is a block diagram illustrating an exemplary control module for wirelessly charging a battery pack. As shown in FIG. 1, the control module may include an electrical power reception coil 10, a rectification block 20, a receiver electrical power control block 30, a charge control block 40, and a battery pack A. In various exemplary embodiments consistent with the present disclosure, the electrical power reception coil 10, the rectification block 20, the receiver electrical power control block 30, and/or the charge control block 40 may be implemented as circuitry included inside the battery pack A.

The receiver electrical power control block 30 may represent an Rx Control Block. The electrical power reception coil 10 may be a secondary coil for wirelessly receiving electrical power. The rectification block 20 may rectify an alternating current from the electrical power coil 10 to a direct signal.

The receiver electrical power control block 30 may control the direct signal from the rectification block 20 to convert it to electrical voltage and electrical current that are suitable for charging the battery. The receiver electrical power control block 30 may also control a rectified wireless electrical power signal from the rectification block 20. The charge control block 40 may control a charging process of the battery pack A by using the electrical energy outputted from the reception power control block 30.

Moreover, the charge control block 40 may charge a battery cell 63 of the battery pack A via a first connector terminal module 51 (e.g., a battery contact terminal). The battery cell 63 may be connected to a temperature sensor or detecting module 62 and a charge detector or observing module 61 (e.g., protection control block).

Figure 3:
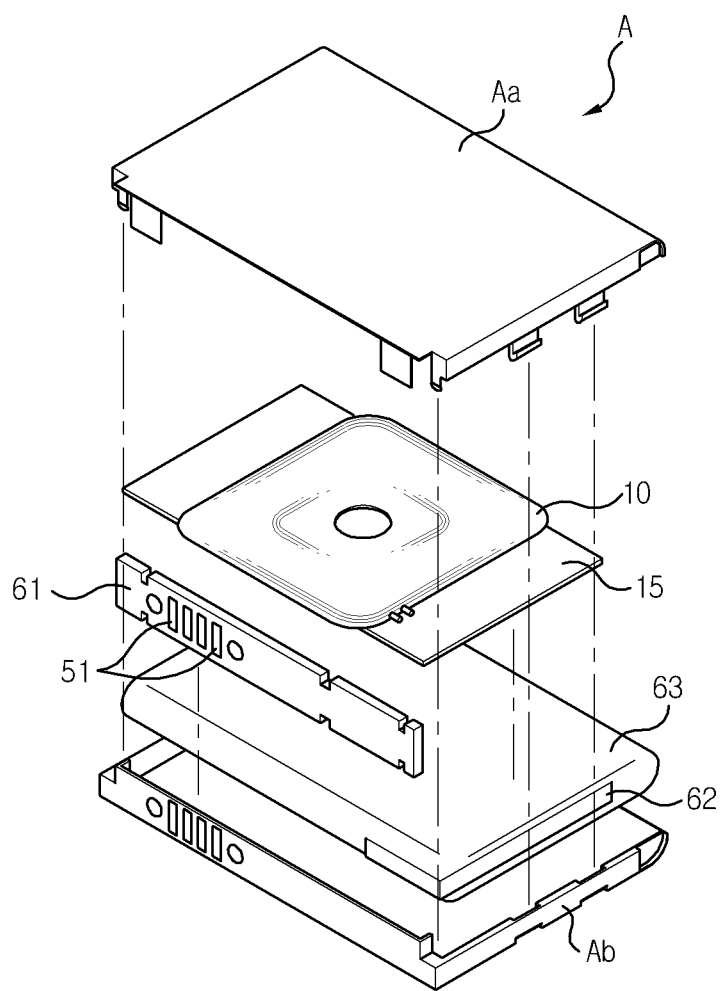
FIG. 3 is an exploded perspective view of an exemplary battery pack configured to be charged wirelessly, consistent with another exemplary aspect of the present disclosure.
Figure 4:
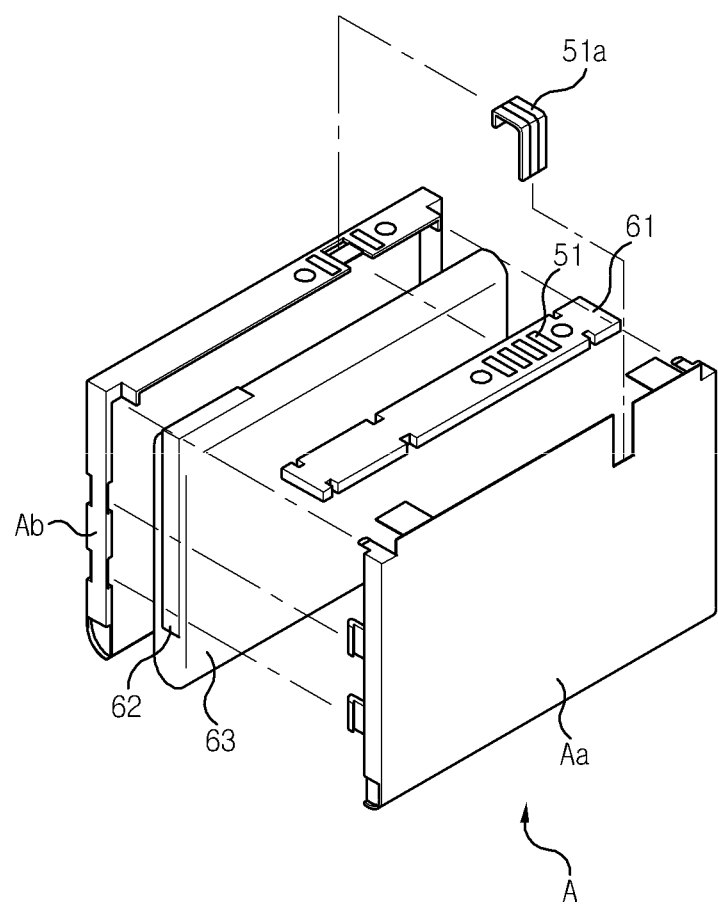
FIG. 4 is an exploded perspective view of another exemplary battery pack, consistent with various exemplary aspects of the present disclosure.

The battery pack A shown in FIG. 1 will be described in greater detail below with reference to FIG. 3 and FIG. 4. As shown in FIG. 3 and FIG. 4, the battery pack A may include a battery pack case Aa and a battery pack case Ab that form an outer housing of the battery pack A. The battery cell 63 may be disposed between the battery cases Aa and Ab.

The temperature detecting module 62 may detect the temperature of the battery cell 63. The temperature detecting module 62 may be installed on one side surface of the battery cell 63. The temperature detecting module 62 may be electrically connected to a charge observing module 61 where the first connector terminal module 51 is installed.

Furthermore, the first connector terminal module 51 installed on the charge observing module 61 may be electrically connected to the electrical power coil 10. A shield plate 15 may be placed between the electrical power coil 10 and the battery cell 63. The shield plate 15 may shield the electromagnetic wave generated from the electrical power coil 10.

In a case of the layout of the control module shown in FIG. 1, the rectification block 20, the receiver electrical power control block 30, and the charge control block 40 (except for the electrical power coil) may be placed under the shield plate 15. Various modification of the layout may be possible.

According to the layout shown in FIG. 1, the electrical power coil 10, the rectification block 20, the receiver electrical power control block 30, and the charge control block 40 may be disposed in order inside the battery pack A. The charge control block 40 may be disposed to connect to the first connector terminal module 51 of the battery pack A. Accordingly, the battery pack A may be charged alone. Moreover, the control module may be adapted to various mobile terminals.

Figure 2:
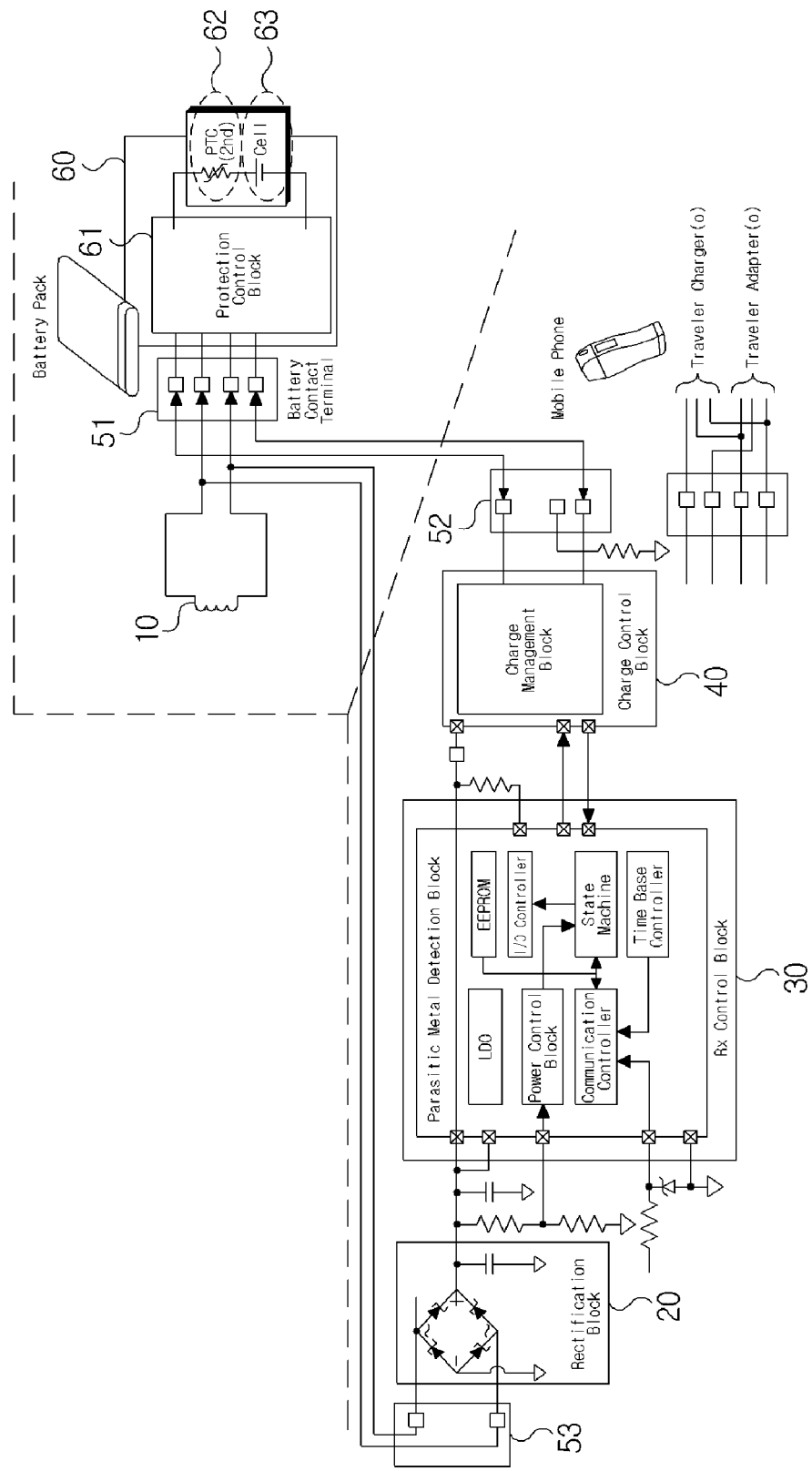
FIG. 2 is a block diagram illustrating another exemplary layout of a control module for wirelessly charging a battery, consistent with another exemplary aspect of the present disclosure.

FIG. 2 is a block diagram of another exemplary layout of a control module for wirelessly charging a battery pack. In this embodiment, an electrical power coil 10 may be disposed within a battery pack A to electrically connect to a first connector terminal module (battery contact terminal) 51 of the battery pack A. A rectification block 20, a receiver electrical power control block 30, and a charge control block 40 may be disposed on a body of the mobile terminal B.

A second connector terminal module 52 may be electrically connected to the charge control block 40. The second contact terminal 52 may be installed inside the body of the mobile terminal B so as to connect to the first connector terminal module 51. The third connector terminal module 53 may be installed inside the body of the mobile terminal B so as to apply the wireless electrical power signal received from the electrical power coil 10 to the rectification block 20.

In the embodiment shown in FIG. 2, only the electrical power coil 10 may be installed inside the battery pack A. The electrical power coil 10 may be a module for charging the battery by receiving the wireless electrical power signal. Accordingly, the production cost may decrease. Moreover, the rectification block 20, the receiver electrical power control block 30, and the charge control block 40 may use the modules installed inside the body of the mobile terminal B.

Figure 7A:
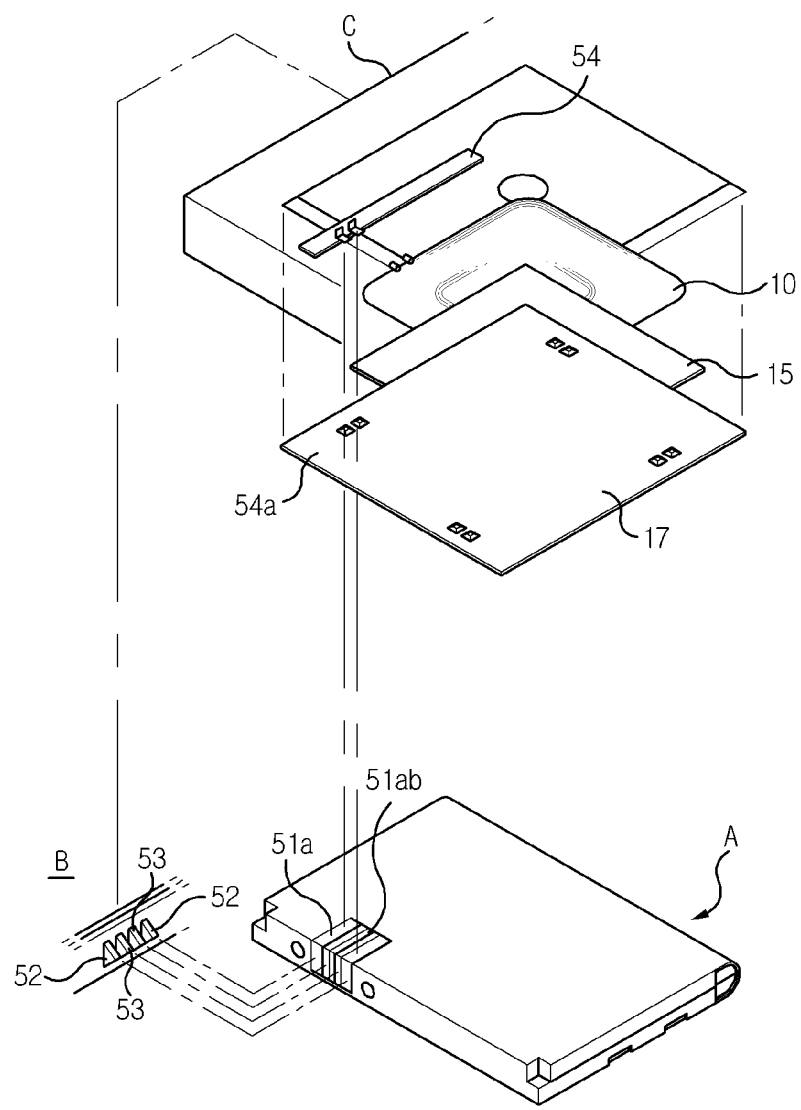
FIG. 7A is a perspective view illustrating an exemplary battery pack and an exemplary cover case for wirelessly charging a battery, consistent with certain exemplary aspects of the present disclosure.
Figure 7B:
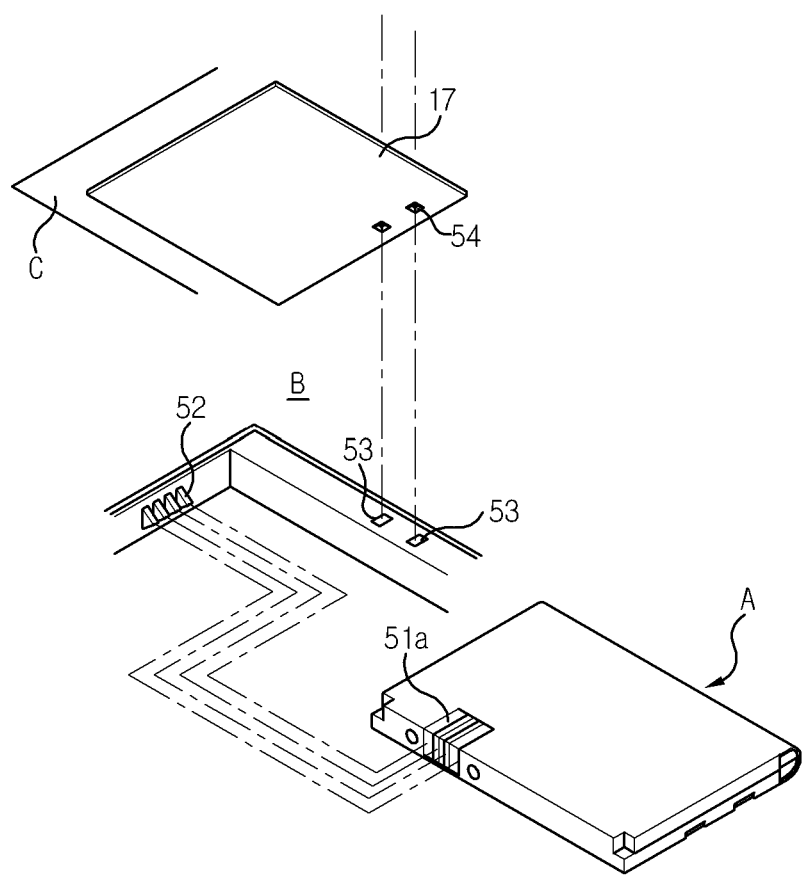
FIG. 7B is a perspective view illustrating an exemplary battery pack and an exemplary cover case for wirelessly charging a battery, consistent with another exemplary aspect of the present disclosure.

Alternatively, a first connector terminal module 51a shown in FIG. 4 may include a first sub-connector terminal 51aa and a second sub-connector terminal 51ab (as shown in FIG. 7A). The first sub-connector terminal 51aa and the second sub-connector terminal 51ab may be integrally connected in the form of letter "L." As shown in FIG. 7A and FIG. 7B, the first connector terminal 51a may be a common electrical terminal for the battery pack A, the body of the mobile terminal B, and the cover case C.

Figure 5:
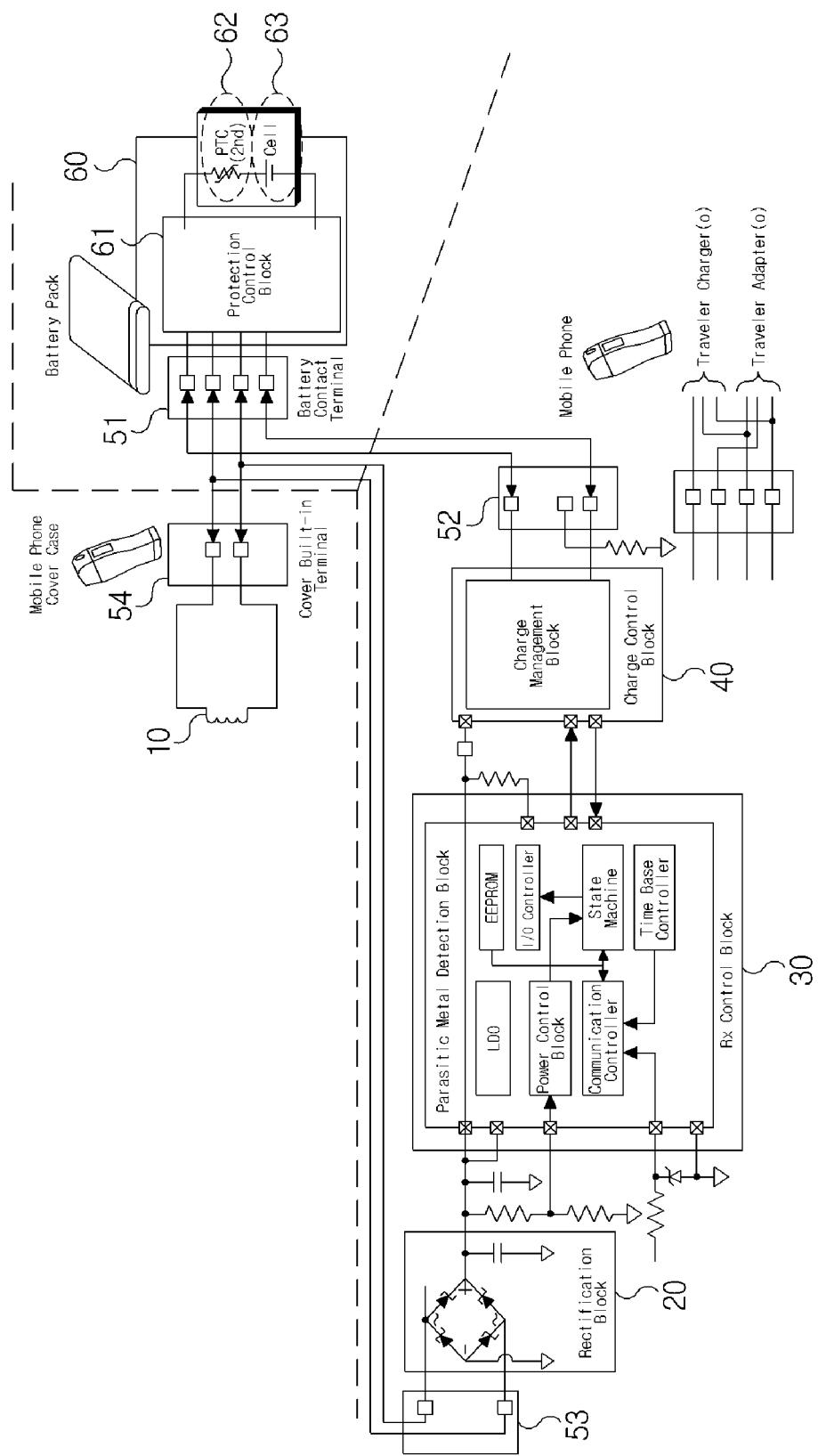
FIG. 5 is a block diagram illustrating another exemplary layout of a control module for wirelessly charging a battery or battery pack, consistent with another exemplary aspect of the present disclosure.

FIG. 5 is a block diagram illustrating another exemplary layout of a control module for wirelessly charging a battery pack. As shown in FIG. 7A, an electrical power coil 10 may be disposed inside a cover case C and may be electrically connected to a fourth connector terminal module 54 of the cover case C. The fourth connector terminal module 54 may be disposed in or integrally formed with the cover case C.

The fourth connector terminal module 54 may be connected to a first connector terminal module (battery contact terminal) 51a and to a second connector terminal module 53 in the body of a mobile terminal B. The first connector terminal module 51a may be connected to the second connector terminal module 52 in the body of the mobile terminal B.

A rectification block 20, a receiver electrical power control block 30, and a charge control block 40 may be orderly disposed inside the body of the mobile terminal B so as to connect a third connector terminal module 53 to the second connector terminal module 52.

Here, as shown in FIG. 7A, the fourth connector terminal module 54 may be a form of a plate spring, which connects to an electrical power coil 10 installed in the cover case C. The fourth connector terminal module 54 may be electrically connected to the first connector terminal module 51a of the battery pack A through a penetrating hole 54a formed on a cap 17 of the cover case C. The position of the penetrating hole 54a may be changed to correspond to the position of the first connector terminal module 51a disposed on the battery pack A.

Therefore, according to the layout shown in FIG. 5, the production cost of the battery pack A may be reduced by installing only the electrical power coil 10 in the battery pack A. The terminals of the battery pack A, the body of the mobile terminal B, and the cover case C may be commonly used, which may result in the reduction of manufacturing cost.

Figure 6:
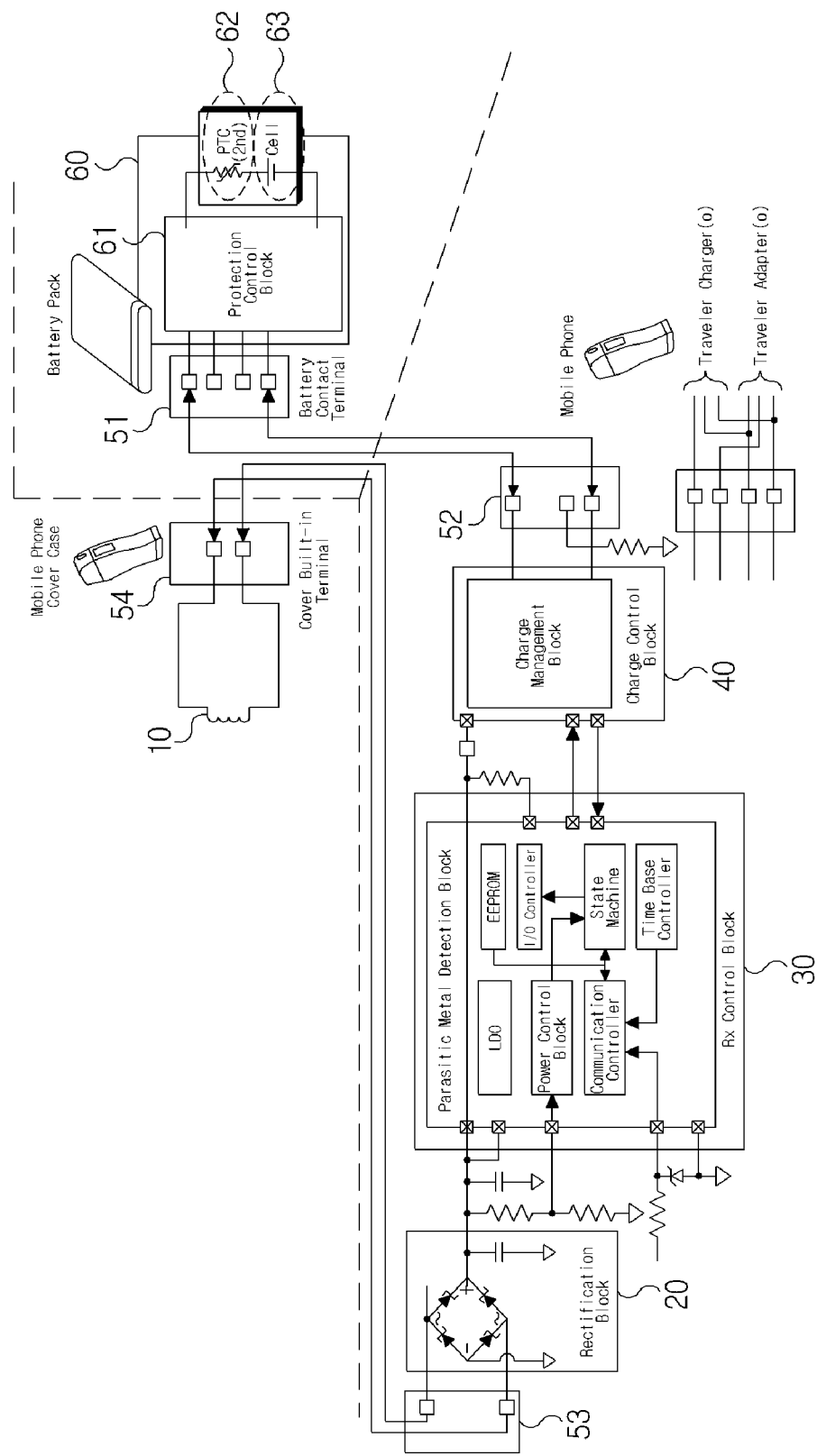
FIG. 6 is a block diagram illustrating still another exemplary layout of a control module for wirelessly charging a battery, consistent with certain exemplary aspects of the present disclosure.

FIG. 6 is a block diagram showing another layout of a control module for wirelessly charging a battery pack. Referring to FIG. 7B, an electrical power coil 10 may be disposed inside a cover case C and may be electrically connected to a fourth connector terminal module 54 of the cover case C.

The fourth connector terminal module 54 may be connected to a third connector terminal module 53 of the mobile terminal B. A rectification block 20, a receiver electrical power control block 30, and a charge control block 40 may be orderly disposed within the body of a mobile terminal B so as to connect the third connector terminal module 53 to a second connector terminal module 52 in the body of the mobile terminal B.

Moreover, the second connector terminal module 52 may be connected to a first connector terminal module 51 of a battery pack A.

Therefore, according to the layout shown in FIG. 6, a normal battery pack may be used since the electrical power coil 10 is installed in the cover case C of the mobile terminal. More specifically, electrical power is received through the terminal of the mobile terminal B, and the rectification block 20, the receiver electrical power control block 30, and the charge control block may be installed in the mobile terminal.

Figure 8:
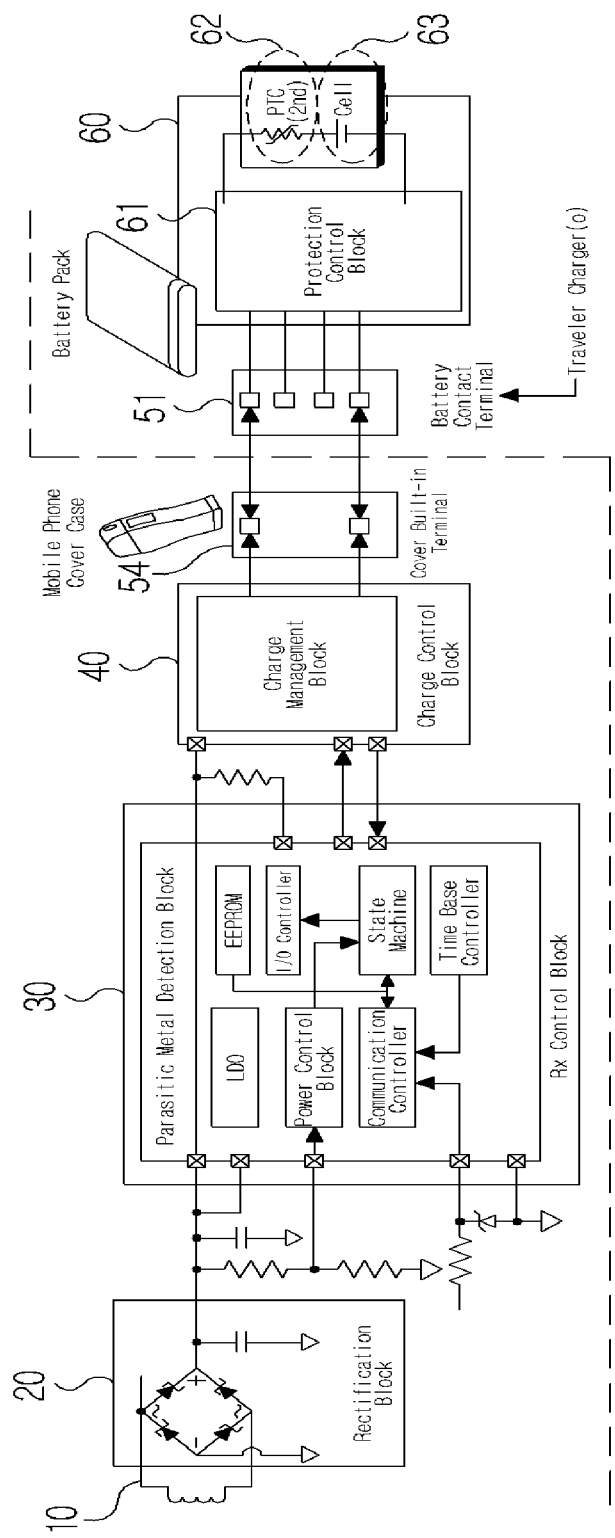
FIG. 8, FIG. 9, and FIG. 10 illustrate various alternative layouts of control modules for wirelessly charging batteries, consistent with various exemplary aspects of the present disclosure.

FIG. 8 illustrates another layout of the control module for wirelessly charging a battery pack. In this embodiment, a rectification block 20, a receiver electrical power control block 30, and a charge control block 40 may be orderly disposed in a cover case C. The charge control block 40 may be electrically connected to a fourth connector terminal module 54 of the cover case C, and the fourth connector terminal module (cover built-in terminal) 54 may be connected to a first connector terminal module (battery contact terminal) 51 of the battery pack.

Therefore, according to the layout shown in FIG. 8, because all the blocks are installed in the cover case C, the terminals of the cover case C and the battery pack may be commonly used. Accordingly, placing another terminal between the cover case C and the mobile terminal B may become unnecessary and, as a result, the production cost may be reduced.

Figure 9:
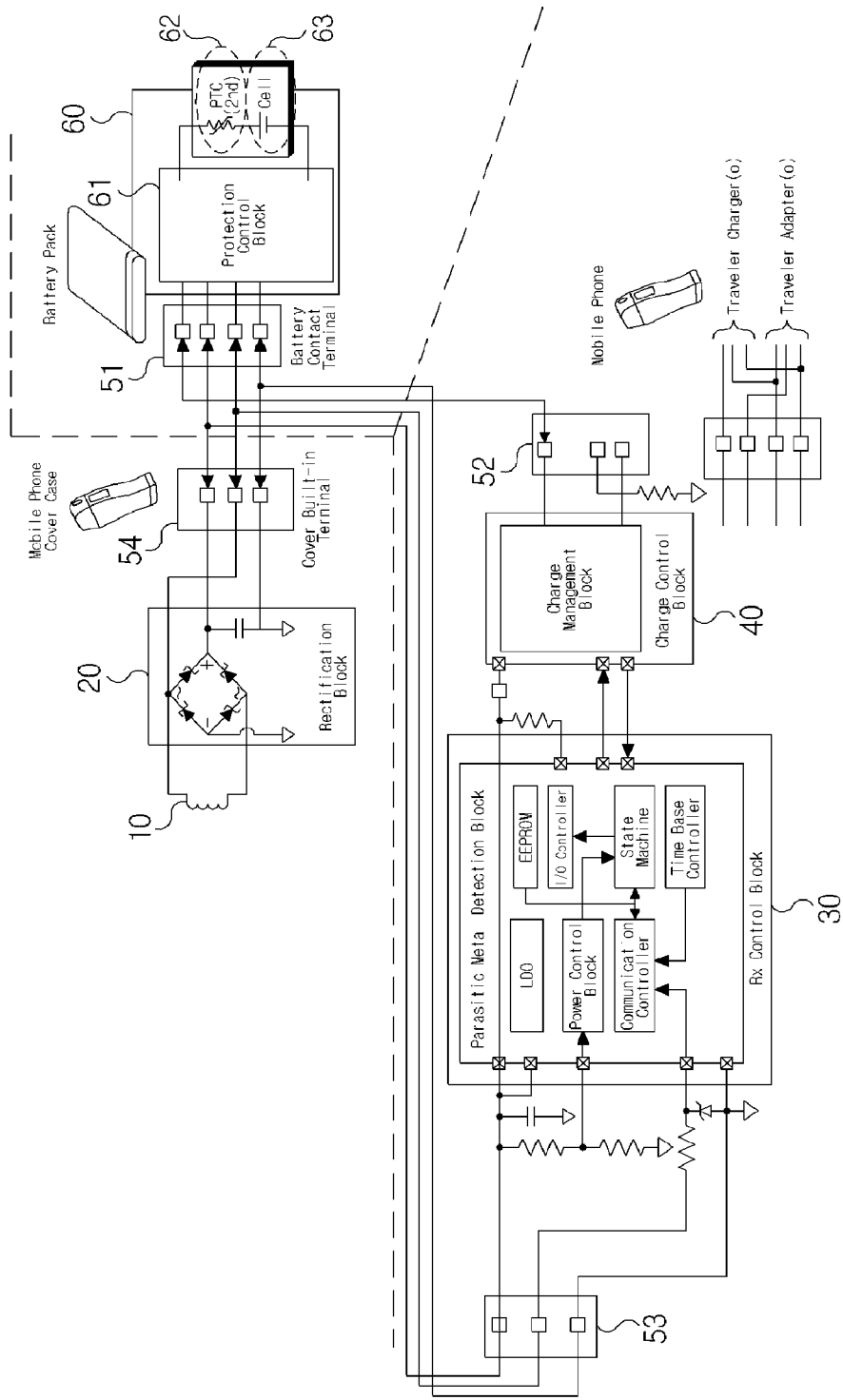

FIG. 9 illustrates still another layout of the control module for wirelessly charging a battery pack. An electrical power coil 10 and a rectification block 20 may be orderly disposed in a cover case C. The rectification block 20 may be connected to a fourth connector terminal module (cover built-in terminal) 54 of the cover case C. And the fourth connector terminal module 54 may be connected to a first connector terminal module (battery contact terminal) 51 of the battery pack A and a third connector terminal module 53 of the body of the mobile terminal B.

The first connector terminal module 51 may be connected to a second connector terminal module 52 of the body of the mobile terminal B. The receiver electrical power control block 30 and the charge control block 40 may be orderly disposed in the body of the mobile terminal B to connect the third connector terminal module 53 to the second connector terminal module 52.

Therefore, according to the layout shown in FIG. 9, the layout may be used when the number of recycled chips in the mobile terminal B is small because the electrical power coil 10 and the rectification block 20 are installed in the cover case C and the terminals of the battery pack A and the cover case C may be commonly used.

Figure 10:
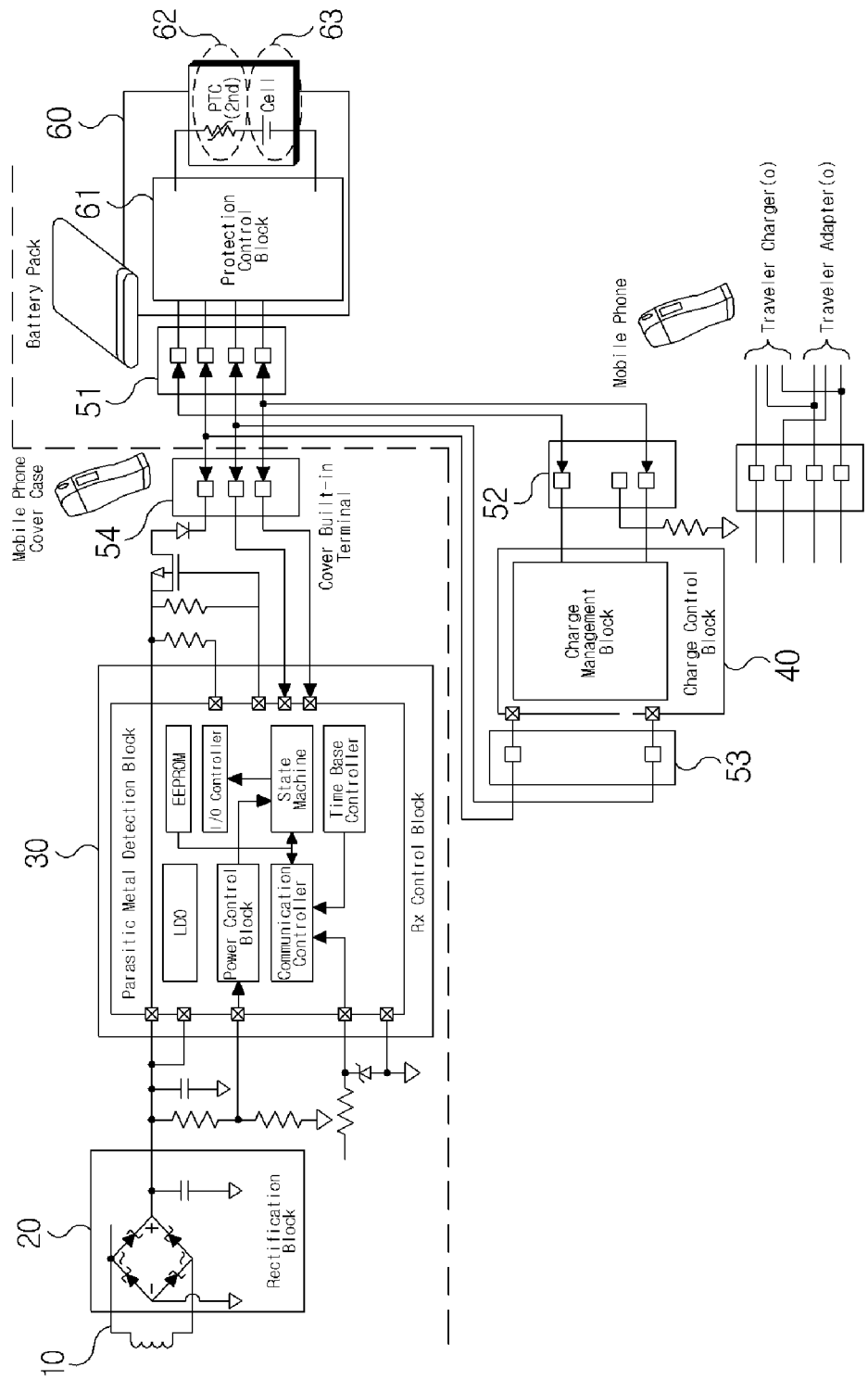

FIG. 10 illustrates another layout of the control module for wirelessly charging a battery pack. An electrical power coil 10, a rectification block 20, and a receiver electrical power control block 30 may be orderly disposed in a cover case C. The receiver electrical power control block 30 may be connected to a fourth connector terminal module (cover built-in terminal) 54 of the cover case C. And the fourth connector terminal module 54 may be connected to a first connector terminal module (battery contact terminal) 51 of the battery pack A and a third connector terminal module 53 of the body of the mobile terminal B. The first connector terminal module 51 and the third connector terminal module 53 may be connected to each other. The first connector terminal module 51 may be connected to a second connector terminal module 52 of the body of the mobile terminal B. The charge control block 40 may be disposed between the third connector terminal module 53 and the second connector terminal module 52 in the body of the mobile terminal B.

Therefore, according to the layout shown in FIG. 10, the electrical power coil 10, the rectification block 20, and the receiver electrical power control block 30 may be installed in the cover case C. The receiver electrical power control may be connected to the fourth connector terminal module 54 of the cover case C. The fourth connector terminal module 54 may be connected to the first connector terminal module 51 of the battery pack A and the second connector terminal module 52 of the body of the mobile terminal B. The first connector terminal module 51 may be connected to the second connector terminal module 52 of the body of the mobile terminal B. The charge control block 40 may be disposed between the third connector terminal module 53 and the second connector terminal module 52 in the body of the mobile terminal B.

Therefore, according to the layout shown in FIG. 10, the layout may be used when the number of the recycled chips in the mobile terminal B is small because the electrical power coil 10, the rectification block 20, and the receiver electrical power control block 30 are installed in the cover case C, and the terminals of the battery pack A and the cover case C are commonly used.

Although certain embodiments have been described above with reference to illustrative examples for particular applications, it will be understood to those skilled in the art that the embodiments described is by way of example only. Those skilled in the art with access to the teachings provided in this disclosure will recognize various variations and additional modifications, applications, and/or embodiments and additional fields in which the present disclosure would be of significant utility. In addition, alternative uses will also be apparent to those skilled in the art.

The limitations in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

What is claimed is:

1. A mobile terminal comprising:
 a battery pack where an L-shaped first connecter terminal is formed;
 a cover including an electrical power coil receiving an electrical power signal, where a fourth connector terminal is formed; and
 a terminal body including a second connecter terminal, a third connector terminal, and a rectification module configured to rectify an alternative power generated from the electrical power coil,
 wherein one side of the L-shaped first connecter terminal is connected to the second connecter terminal and the third connector terminal, and the other side of the L-shaped first connecter terminal is connected to the fourth connector terminal of the cover.

2. The mobile terminal of claim 1,
 wherein the cover substantially encloses at least the battery pack; and
 the second connector terminal configured to transmit the wireless electrical power signal from the electrical power coil to the battery pack.

3. The mobile terminal of claim 1, wherein the fourth connector terminal comprises a plate spring.

4. The mobile terminal of claim 1, wherein a reception power control block and a charge control block are disposed between the second connector terminal and a third connector terminal.

5. The mobile terminal of claim 2, wherein the second connector terminal is electrically connected to the first connector terminal.

* * * * *